(12) United States Patent (10) Patent No.: US 7,813,271 B2
Fourcand (45) Date of Patent: Oct. 12, 2010

(54) AGGREGATED LINK TRAFFIC PROTECTION

(75) Inventor: Serge Francois Fourcand, Fairview, TX (US)

(73) Assignee: Futurewei Technologies, Inc., Plano, TX (US)

( * ) Notice: Subject to any disclaimer, the term of this patent is extended or adjusted under 35 U.S.C. 154(b) by 599 days.

(21) Appl. No.: 11/739,316

(22) Filed: Apr. 24, 2007

(65) Prior Publication Data

US 2008/0074996 A1 Mar. 27, 2008

Related U.S. Application Data

(60) Provisional application No. 60/826,764, filed on Sep. 25, 2006, provisional application No. 60/857,741, filed on Nov. 8, 2006, provisional application No. 60/886,833, filed on Jan. 26, 2007.

(51) Int. Cl.
*G01R 31/08* (2006.01)
*H04J 3/00* (2006.01)
*G06F 11/00* (2006.01)

(52) U.S. Cl. .............................. 370/228; 370/464; 714/1

(58) Field of Classification Search ................. 370/216, 370/225, 227–228, 242–244, 389, 464, 474; 714/1, 2, 6; 709/238
See application file for complete search history.

(56) References Cited

U.S. PATENT DOCUMENTS

| | | | |
|---|---|---|---|
| 5,303,241 A | 4/1994 | Takada et al. | |
| 5,361,261 A | 11/1994 | Edem et al. | |
| 5,367,524 A | 11/1994 | Rideout, Jr. et al. | |
| 5,434,848 A | 7/1995 | Chimento, Jr. et al. | |
| 5,696,798 A | 12/1997 | Wright et al. | |
| 5,802,051 A | 9/1998 | Petersen et al. | |
| 5,933,607 A | 8/1999 | Tate et al. | |
| 6,049,541 A | 4/2000 | Kerns et al. | |

(Continued)

FOREIGN PATENT DOCUMENTS

CN 1293843 5/2001

(Continued)

OTHER PUBLICATIONS

Foreign Communication From a Related Counterpart Application—International Search Report and Written Opinion, PCT/CN2008/070046, Apr. 17, 2008, 6 pages.

(Continued)

*Primary Examiner*—Nittaya Juntima
(74) *Attorney, Agent, or Firm*—Conley Rose, P.C.; Grant Rodolph (57) ABSTRACT

A network component comprising a processor configured to implement a method comprising communicating a data stream to a destination over a plurality of links, the data stream comprising a high priority data and a plurality of low priority data, wherein the high priority data is duplicated over at least two of the links, and wherein the low priority data is distributed over at least some of the links. Also disclosed is a method comprising receiving a plurality of data streams, each data stream comprising a high priority data and a low priority data, wherein each data stream is received on one of a plurality of links in an aggregated link, and wherein the high priority data in each data stream is substantially identical.

20 Claims, 7 Drawing Sheets

U.S. PATENT DOCUMENTS

| | | |
|---|---|---|
| 6,272,109 B1 | 8/2001 | Pei et al. |
| 6,320,877 B1 | 11/2001 | Humphrey et al. |
| 6,487,169 B1 | 11/2002 | Tada |
| 6,496,477 B1* | 12/2002 | Perkins et al. .............. 370/228 |
| 6,501,810 B1 | 12/2002 | Karim et al. |
| 6,577,631 B1 | 6/2003 | Keenan et al. |
| 6,633,566 B1 | 10/2003 | Pierson, Jr. |
| 6,754,206 B1 | 6/2004 | Nattkemper et al. |
| 6,847,644 B1 | 1/2005 | Jha |
| 6,859,458 B2 | 2/2005 | Yuang et al. |
| 6,868,093 B1 | 3/2005 | Bohm et al. |
| 6,874,048 B2 | 3/2005 | Knapp et al. |
| 6,944,163 B2 | 9/2005 | Bottorff et al. |
| 6,959,151 B1 | 10/2005 | Cotter et al. |
| 6,985,499 B2 | 1/2006 | Elliot |
| 6,999,479 B1 | 2/2006 | Jha |
| 7,007,099 B1 | 2/2006 | Donati et al. |
| 7,031,341 B2 | 4/2006 | Yu |
| 7,103,124 B1 | 9/2006 | Lindskog et al. |
| 7,188,189 B2* | 3/2007 | Karol et al. ................ 709/238 |
| 7,236,126 B2 | 6/2007 | Jeon et al. |
| 7,305,002 B1 | 12/2007 | Ageby et al. |
| 7,436,765 B2 | 10/2008 | Sisto et al. |
| 7,463,709 B2 | 12/2008 | Raphaeli et al. |
| 7,496,112 B1 | 2/2009 | Danielson et al. |
| 7,519,747 B1 | 4/2009 | Cory et al. |
| 7,646,710 B2* | 1/2010 | Christie, IV ............... 370/230 |
| 2001/0043603 A1 | 11/2001 | Yu |
| 2001/0053130 A1 | 12/2001 | Tanaka et al. |
| 2002/0068593 A1 | 6/2002 | Deltour et al. |
| 2002/0163926 A1 | 11/2002 | Moharram |
| 2003/0117899 A1 | 6/2003 | Edison |
| 2003/0219042 A1 | 11/2003 | Tosa |
| 2004/0001483 A1 | 1/2004 | Schmidt et al. |
| 2004/0028408 A1 | 2/2004 | Cox et al. |
| 2004/0062265 A1 | 4/2004 | Poledna |
| 2004/0063401 A1 | 4/2004 | Meckelburg et al. |
| 2004/0066775 A1 | 4/2004 | Grovenburg |
| 2004/0120438 A1 | 6/2004 | Forte |
| 2004/0177162 A1 | 9/2004 | Wetzel et al. |
| 2004/0208554 A1 | 10/2004 | Wakai et al. |
| 2004/0252688 A1 | 12/2004 | May et al. |
| 2005/0117576 A1 | 6/2005 | McDysan et al. |
| 2005/0141568 A1 | 6/2005 | Kwak et al. |
| 2005/0190796 A1 | 9/2005 | Date et al. |
| 2005/0254484 A1 | 11/2005 | Barzegar et al. |
| 2005/0278457 A1 | 12/2005 | Hall et al. |
| 2006/0015507 A1 | 1/2006 | Butterworth et al. |
| 2006/0092985 A1 | 5/2006 | Cho et al. |
| 2006/0176905 A1 | 8/2006 | Liu et al. |
| 2006/0182144 A1 | 8/2006 | Dove et al. |
| 2006/0233116 A1 | 10/2006 | Kyusojin et al. |
| 2006/0239300 A1 | 10/2006 | Hannel et al. |
| 2006/0256768 A1* | 11/2006 | Chan ........................... 370/351 |
| 2006/0274791 A1 | 12/2006 | Garcia et al. |
| 2007/0022209 A1 | 1/2007 | Delvai et al. |
| 2007/0076605 A1* | 4/2007 | Cidon et al. ................ 370/230 |
| 2007/0097926 A1 | 5/2007 | Liu et al. |
| 2007/0121661 A1 | 5/2007 | Ohta et al. |
| 2007/0140127 A1 | 6/2007 | Frei |
| 2007/0201365 A1 | 8/2007 | Skoog et al. |
| 2007/0206603 A1 | 9/2007 | Weich et al. |
| 2007/0206709 A1 | 9/2007 | Khermosh et al. |
| 2007/0211720 A1 | 9/2007 | Fuchs et al. |
| 2007/0211750 A1 | 9/2007 | Li et al. |
| 2007/0299987 A1 | 12/2007 | Parker et al. |
| 2008/0031136 A1 | 2/2008 | Gavette et al. |
| 2008/0181114 A1 | 7/2008 | Fourcand |
| 2009/0254685 A1 | 10/2009 | Diepstraten et al. |
| 2009/0274172 A1 | 11/2009 | Shen et al. |

FOREIGN PATENT DOCUMENTS

| | | |
|---|---|---|
| CN | 1352841 A1 | 6/2002 |
| CN | 1512683 A | 7/2004 |
| CN | 1516463 A | 7/2004 |
| CN | 1522077 | 8/2004 |
| CN | 1522510 A | 8/2004 |
| CN | 1529471 A | 9/2004 |
| CN | 1571348 | 1/2005 |
| CN | 1575568 A | 2/2005 |
| CN | 1710828 | 12/2005 |
| CN | 1728720 A | 2/2006 |
| CN | 1767499 | 5/2006 |
| CN | 1770673 | 5/2006 |
| CN | 1773887 | 5/2006 |
| CN | 1788501 A | 6/2006 |
| CN | 1855935 | 11/2006 |
| EP | 1091529 A | 4/2001 |
| EP | 1655885 | 5/2006 |
| EP | 1771027 A1 | 4/2007 |
| GB | 2366161 A | 2/2002 |
| JP | 2003188912 A | 7/2003 |
| WO | 9956422 | 11/1999 |
| WO | 02099578 A | 12/2002 |
| WO | 03017543 A1 | 2/2003 |
| WO | 03032539 A1 | 4/2003 |
| WO | 03087984 A2 | 10/2003 |
| WO | 2005101755 A1 | 10/2005 |
| WO | 2006051465 A1 | 5/2006 |
| WO | 2006056415 A1 | 6/2006 |

OTHER PUBLICATIONS

Fourcand, Serge F.; U.S. Appl. No. 11/735,590; Title: "Inter-Packet Gap Network Clock Synchronization"; Filing Date: Apr. 16, 2007; Specification 44 pgs.; 9 Drawing Sheets (Figs. 1-4, 5A-5B, 6A-6B, 7A-7B, 8, 9A-9B, 10-11).

Fourcand, Serge F.; U.S. Appl. No. 11/735,591; Title: "Multiplexed Data Stream Payload Format"; Filing Date: Apr. 16, 2007; Specification 41 pgs.; 10 Drawing Sheets (Figs. 1, 2A-2B, 3-7, 8A-8B, 9, 10A-10B, 11-18).

Fourcand, Serge F.; U.S. Appl. No. 11/737,800; Title: "Multi-Network Compatible Data Architecture"; Filing Date: Apr. 20, 2007; Specification 57 pgs.; 18 Drawing Sheets (Figs. 1-5, 6A-6B, 7A-7B, 8A-8B, 9-23).

Fourcand, Serge F.; U.S. Appl. No. 11/735,592; Title: "Network Clock Synchronization Timestamp"; Filing Date: Apr. 16, 2007; Specification 43 pgs.; 9 Drawing Sheets (Figs. 1-4, 5A-5B, 6A-6B, 7A-7B, 8, 9A-9B, 10-11).

Fourcand, Serge F.; U.S. Appl. No. 11/735,596; Title: "Multi-Frame Network Clock Synchronization"; Filing Date: Apr. 16, 2007; Specification 44 pgs.; 9 Drawing Sheets (Figs. 1-4, 5A-5B, 6A-6B, 7A-7B, 8, 9A-9B, 10-11).

Fourcand, Serge F.; U.S. Appl. No. 11/735,598; Title: "Network Clock Synchronization Floating Window and Window Delineation"; Filing Date: Apr. 16, 2007; Specification 43 pgs.; 9 Drawing Sheets (Figs. 1-4, 5A-5B, 6A-6B, 7A-7B, 8, 9A-9B, 10-11).

Fourcand, Serge F.; U.S. Appl. No. 11/735,602; Title: "Multiplexed Data Stream Timeslot Map"; Filing Date: Apr. 16, 2007; Specification 41 pgs.; 10 Drawing Sheets (Figs. 1, 2A-2B, 3-7, 8A-8B, 9, 10A-10B, 11-18).

Fourcand, Serge F.; U.S. Appl. No. 11/735,604; Title: "Bandwidth Reuse in Multiplexed Data Stream"; Filing Date: Apr. 16, 2007; Specification 40 pgs.; 10 Drawing Sheets (Figs. 1, 2A-2B, 3-7, 8A-8B, 9, 10A-10B, 11-18).

Fourcand, Serge F.; U.S. Appl. No. 11/735,605; Title: "Multiplexed Data Stream Circuit Architecture"; Filing Date: Apr. 16, 2007; Specification 41 pgs.; 10 Drawing Sheets (Figs. 1, 2A-2B, 3-7, 8A-8B, 9, 10A-10B, 11-18).

Fourcand, Serge F.; U.S. Appl. No. 11/737,803; Title: "Multi-Component Compatible Data Architecture"; Filing Date: Apr. 20, 2007; Specification 57 pgs.; 18 Drawing Sheets (Figs. 1-5, 6A-6B, 7A-7B, 8A-8B, 9-23).

Precise Networked Clock Synchronization Working Group of the IM/ST Committee, IEEE P1588™ D2.2, "Draft Standard for a Precision Clock Synchronization Protocol for Networked Measurement and Control Systems," 2007, 305 pages, IEEE Standards Activities Department, Piscataway, NJ.

Office Action dated May 12, 2009, 15 pages, U.S. Appl. No. 11/737,800, filed Apr. 20, 2007.

Office Action dated Aug. 7, 2009, 10 pages, U.S. Appl. No. 11/735,590, filed Apr. 16, 2007.

Office Action dated Sep. 2, 2009, 13 pages, U.S. Appl. No. 11/735,592, filed Apr. 16, 2007.

Office Action dated Sep. 3, 2009, 15 pages, U.S. Appl. No. 11/735,596, filed Apr. 16, 2007.

Office Action dated Sep. 30, 2009, 9 pages, U.S. Appl. No. 11/735,598, filed Apr. 16, 2007.

Office Action dated Sep. 18, 2009, 13 pages, U.S. Appl. No. 11/735,602, filed Apr. 16, 2007.

Office Action dated Sep. 15, 2009, 13 pages, U.S. Appl. No. 11/735,604, filed Apr. 16, 2007.

Office Action dated Jun. 26, 2009, 15 pages, U.S. Appl. No. 11/737,803, filed Apr. 20, 2007.

Foreign Communication From a Related Counterpart Application—International Search Report and Written Opinion, PCT/CN2008/070037, Apr. 17, 2008, 10 pages.

Foreign Communication From a Related Counterpart Application—International Search Report and Written Opinion, PCT/CN2008/070038, Apr. 17, 2008, 6 pages.

Foreign Communication From a Related Counterpart Application—International Search Report and Written Opinion, PCT/CN2008/070045, Apr. 17, 2008, 7 pages.

Foreign Communication From a Related Counterpart Application—International Search Report and Written Opinion, PCT/CN2008/070183, May 8, 2008, 11 pages.

Foreign Communication From a Related Counterpart Application—International Search Report and Written Opinion, PCT/CN2008/070632, Jul. 10, 2008, 5 pages.

Foreign Communication From a Related Counterpart Application—International Search Report and Written Opinion, PCT/CN2008/070630, Jul. 3, 2008, 8 pages.

Foreign Communication From a Related Counterpart Application—International Search Report and Written Opinion, PCT/CN2008/070690, Jul. 17, 2008, 7 pages.

Foreign Communication From a Related Counterpart Application—International Search Report and Written Opinion, PCT/CN2008/070717, Jul. 24, 2008, 10 pages.

Foreign Communication From a Related Counterpart Application—International Search Report and Written Opinion, PCT/CN2008/070017, Apr. 3, 2008, 6 pages.

Foreign Communication From a Related Counterpart Application—International Search Report and Written Opinion, PCT/CN2008/070005, Apr. 10, 2008, 9 pages.

Communication From a Related Counterpart Application—International Search Report and Written Opinion, PCT/CN20081070007, Apr. 17, 2008, 8 pages.

Fourcand, Serge F.; U.S. Appl. No. 12/691,367 ; Title: "Multi-Component Compatible Data Architecture"; Filing Date Jan. 21, 2010; Specification 56 pgs.; 17 Drawing Sheets (Figs. 1-5, 6A-6B, 7A-7B, 8A-8B, 9-23).

Fourcand, Serge F.; U.S. Appl. No. 12/691,372 ; Title: "Multi-Component Compatible Data Architecture"; Filing Date Apr. 20, 2007; Specification 56 pgs.; 17 Drawing Sheets (Figs. 1-5, 6A-6B, 7A-7B, 8A-8B, 9-23).

Office Action dated Nov. 23, 2009, 19 pages, U.S. Appl. No. 11/737,800, filed Apr. 20, 2007.

Office Action dated Dec. 30, 2009, 22 pages, U.S. Appl. No. 11/735,590, filed Apr. 16, 2007.

Office Action dated Sep. 23, 2009, 10 pages, U.S. Appl. No. 11/735,591, filed Apr. 16, 2007.

Office Action dated Jan. 6, 2010, 19 pages, U.S. Appl. No. 11/735,591, filed Apr. 16, 2007.

Office Action dated Feb. 26, 2010, 22 pages, U.S. Appl. No. 11/971,386, filed Jan. 9, 2008.

Office Action dated Feb. 18, 2010, 22 pages, U.S. Appl. No. 11/735,592, filed Apr. 16, 2007.

Office Action dated Feb. 2, 2010, 23 pages, U.S. Appl. No. 11/735,596, filed Apr. 16, 2007.

Office Action dated Feb. 17, 2010, 23 pages, U.S. Appl. No. 11/735,598, filed Apr. 16, 2007.

Office Action dated Feb. 22, 2010, 21 pages, U.S. Appl. No. 11/735,602, filed Apr. 16, 2007.

Office Action dated Feb. 17, 2010, 24 pages, U.S. Appl. No. 11/735,604, filed Apr. 16, 2007.

Office Action dated Oct. 29, 2009, 9 pages, U.S. Appl. No. 11/735,605.

Office Action dated Mar. 3, 2010, 20 pages, U.S. Appl. No. 11/735,605.

Office Action—Notice of Allowance—dated Dec. 29, 2009, 16 pages U.S. Appl. No. 11/737,803, filed Apr. 20, 2007.

Foreign Communication From a Related Counterpart Application—European Search Report, EP Application 08700032.9, Dec. 2, 2009, 7 pages.

* cited by examiner

Fig. 11 ically, Ethernet 65 synchronous timeslot scheme.
AGGREGATED LINK TRAFFIC PROTECTION

CROSS-REFERENCE TO RELATED APPLICATIONS

This application claims the benefit of U.S. Provisional Application Ser. No. 60/826,764 filed Sep. 25, 2006 and entitled "System for TDM Data Transport Over Ethernet Interfaces," U.S. Provisional Application Ser. No. 60/857,741 filed Nov. 8, 2006 and entitled "TDM Data Transport Over Ethernet," and U.S. Provisional Application Ser. No. 60/886,833 filed Jan. 26, 2007 and entitled "Closed Loop Clock Synchronization," all of which are by Serge F. Fourcand and are incorporated herein by reference as if reproduced in their entirety.

This application is related to U.S. patent application Ser. No. 11/735,590 filed Apr. 16, 2007 and entitled "Inter-Packet Gap Network Clock Synchronization," U.S. patent application Ser. No. 11/735,591 filed Apr. 16, 2007 and entitled "Multiplexed Data Stream Payload Format," and U.S. patent application Ser. No. 11/737,800 filed Apr. 20, 2007 and entitled "Multi-Network Compatible Data Architecture," which are by Serge F. Fourcand and are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet is flexible in that it allows variable-sized data packets to be transported across different types of mediums using various nodes each having different transmission speeds. Ethernet is decentralized in that it allows the end devices to transmit and receive data without oversight or intervention from a centralized server or party. Furthermore, Ethernet is scalable in that it can be implemented in both small-scale and large-scale networks. These advantages make Ethernet a preferred choice for data distribution in many computer networks.

Unfortunately, Ethernet does have some drawbacks. When Ethernet packets are transported through the network, the Ethernet packets contend with other traffic being transported over the same links or through the same nodes. The contentious traffic not only includes packets bound for the same destination, but also packets bound for other destinations that are transported over the same link or through the same node as the Ethernet packet. This contention produces burstiness and jitter at the nodes within the network. Some of these problems can be addressed by using resource arbitration and buffers at the nodes, and by prioritizing the packets into high priority data and low priority data. However, these solutions increase network complexity, increase delay, and detract from the inherent advantages of Ethernet.

The aforementioned drawbacks are part of the reason Ethernet has not been widely implemented in networks carrying time division multiplexed (TDM) data. Specifically, Ethernet does not provide a sufficient Quality of Service (QoS) to meet the stringent jitter and data loss requirements for voice traffic in the public switched telephone network (PSTN) and other TDM networks. Instead, TDM traffic is carried by highly synchronized networks, such as synchronous optical networks (SONET) and synchronous digital hierarch (SDH) networks. Various Ethernet enhancements, such as circuit emulation, provider backbone transport, and pseudowires, have been proposed to address the jitter and data loss issues, but these enhancements fail to couple the flexibility of Ethernet with the high QoS requirements of TDM networks. Thus, a need exists for an improved Ethernet protocol that is flexible, easy to implement, supports the QoS requirements of TDM networks, and is compatible with existing technology.

SUMMARY

In one aspect, the disclosure includes a network component comprising a processor configured to implement a method comprising communicating a data stream to a destination over a plurality of links, the data stream comprising a high priority data and a plurality of low priority data, wherein the high priority data is duplicated over at least two of the links, and wherein the low priority data is distributed over at least some of the links.

In another aspect, the disclosure includes a method comprising receiving a plurality of data streams, each data stream comprising a high priority data and a low priority data, wherein each data stream is received on one of a plurality of links in an aggregated link, and wherein the high priority data in each data stream is substantially identical.

In a third aspect, the disclosure includes a network comprising a first node, a second node, a first path coupling the first node to the second node, and a second path coupling the first node to the second node, wherein a first data stream comprising a high priority data and a first low priority data is communicated over the first path, and wherein a second data stream comprising the high priority data and a second low priority data is communicated over the second path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their fill scope of equivalents.

Disclosed herein is a system and method that transports high priority data and low priority data over an aggregated link comprising a plurality of links. The high priority data and low priority data may be organized into a time division multiplexed (TDM) pattern of high priority and low priority timeslots that are transported by the links. Specifically, each high priority timeslot may carry the same high priority data across the various links, whereas each low priority timeslot may carry different low priority data over each of the links. When one of the links carrying the high priority data fails, the downstream node receives the high priority data on one of the remaining links. Thus, the system provides a redundant transport path for the high priority data when one of the links fails. In some embodiments, the nodes connected to the aggregated link may be synchronized with each other to increase the efficiency of the multicasting process.

Figure 1:
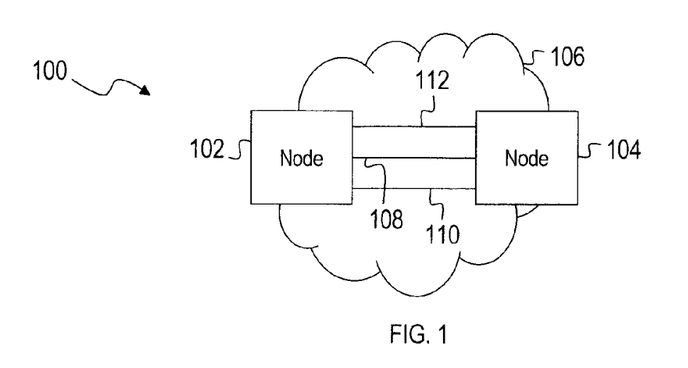
FIG. 1 is an illustration of an embodiment of a data transport system.

FIG. 1 illustrates one embodiment of a system 100 that transports data from one location to another location. The system 100 comprises a first node 102, a second node 104, a network 106, a first link 108, a second link 110, and a third link 112. It should be recognized that while FIG. 1 illustrates a network 106 with three links 108, 110, 112, it is contemplated that the network 106 may contain any other quantity of links 108, 110, 112. Similarly, the network 106 is not limited to two nodes 102, 104, but instead can accommodate any number of nodes 102, 104. Generally, nodes 102, 104 may exchange data with each other via at least one of the links 108, 110, 112 in the network 106. As explained in detail below, two or more of the links 108, 110, or 112 may be logically grouped together to form the aggregated link.

The nodes 102, 104 may be any devices, components, or networks that may produce and/or receive data. For example, the nodes 102, 104 may be routers, switches, or bridges, including backbone core bridges (BCBs), backbone edge bridges (BEBs), provider core bridges (PCBs), and provider edge bridges (PEBs). Alternatively, the nodes 102, 104 may be fixed or mobile user-oriented devices, such as desktop computers, notebook computers, personal digital assistants (PDAs), or cellular telephones. The nodes 102, 104 may produce and/or receive data streams, or merely pass the received data streams onto other nodes 102, 104. The nodes 102, 104 may be either upstream nodes or downstream nodes as those terms are used herein.

The network 106 may be any communication system that may be used to transport data between nodes 102, 104. For example, the network 106 may be a wire-line network or an optical network, including backbone, provider, and access networks. Such networks typically implement SONET, SDH, Ethernet, or other protocols. Alternatively, the network 106 may be a wireless network, such as a WiMAX, cellular, or one of the Institute for Electrical and Electronic Engineers (IEEE) 802.11 networks. Further in the alternative, the network 106 may be any other network known to persons of ordinary skill in the art.

In an embodiment, the links 108, 110, 112 are devices or networks that transport data between a plurality of nodes. Specifically, the links 108, 110, 112 may be physical, virtual, and/or wireless connections that traverse at least part of the network 106. Each of the links 108, 110, 112 may connect a single port on node 102 and with a single port on node 104. Although the links 108, 110, 112 may contain one or more intermediate nodes, the links 108, 110, 112 may also be a plurality of physical links that directly connect to the ports on each of the nodes 102, 104. The individual nodes 102, 104 and links 108, 110, 112 may have different properties, such as physical structure, capacity, transmission speed, and so forth.

Link aggregation may be defined as the combination of a plurality of physical links into a single logical link. For example, two of the links 108, 110, 112 may be grouped together to form one aggregated link between nodes 102 and 104. When individual links 108, 110, 112 are aggregated, the bandwidth associated with the links 108, 110, 112 is also aggregated. For example, if link 108 and link 110 each have a bandwidth of one gigabit per second (Gbps), then the aggregated link may have a bandwidth of two Gbps. In embodiments, the link aggregation may conform to IEEE 802.3ah, which is a standard for link aggregation in Ethernet networks and is incorporated herein by reference as if reproduced in its entirety.

Aggregated links may allow bandwidth to be increased with greater granularity than individual links. Specifically, technology upgrades typically result in bandwidth increases of an order of magnitude. For example, a first generation link may provide a data rate of one Gbps, while a second generation link may provide a data rate of ten Gbps. If link 108 is a first generation link and needs to be upgraded to three Gbps, then upgrading the link 108 to the second generation may produce seven Gbps of unused bandwidth. Instead, first generation links 110 and 112 can be aggregated with link 108 to provide the required bandwidth. As such, link aggregation allows bandwidth to be upgraded incrementally, and may be more cost effective than other upgrade solutions.

Link aggregation may also provide increased resilience by allowing multiple operational states. A single link may be described as being in a fully operational state when the single link is in an "up" or connected state. Likewise, the single link may be described as being in a non-operational state when the single link is in a "down" or disconnected state, which may include degraded service states. While an aggregated link may be fully up or fully down, the aggregated link may also exist in one of several partially up or partially down states. For example, if an aggregated link includes two links and each of the links has an equal capacity, then the aggregated link may operate in one of a fully up state where all of the links are up, a half up state where one link is up and the other link is down, or a fully down state where all of the links are down.

Figure 2:
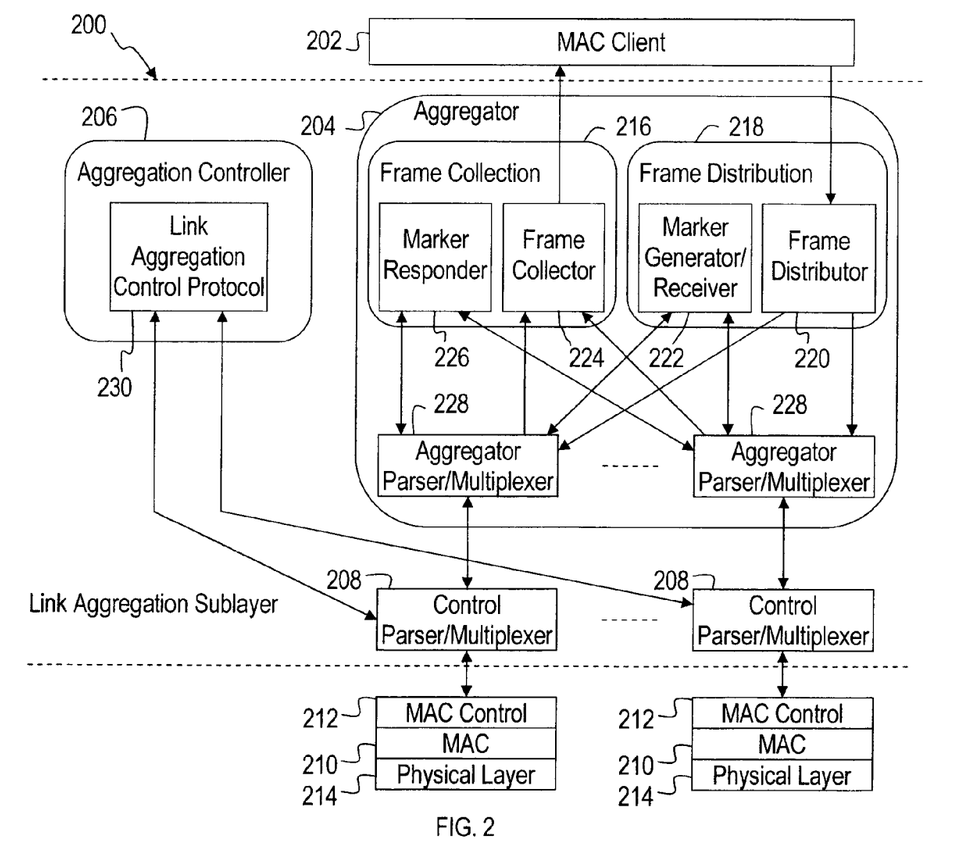
FIG. 2 is an illustration of an embodiment of a link aggregation sublayer.

FIG. 2 illustrates an exemplary block diagram of the link aggregation sublayer 200. The link aggregation sublayer 200 separates a single frame stream into a plurality of frame streams at an upstream node. The plural frame streams may then be transmitted over an aggregated link to a downstream node comprising a similar link aggregation sublayer 200 that combines the plural frame streams back into a single frame stream. The link aggregation sublayer 200 may be implemented as a sublayer between the media access control (MAC) client 202 and the MAC sublayers. In such a case, the link aggregation sublayer 200 may combine a number of individual MACs, such that a single MAC interface is presented to the MAC client 202. In an embodiment, the link aggregation sublayer 200 may separate the frame streams such that the link aggregation sublayer 200 is backwards compatible with existing nodes.

In an embodiment, the frame stream produced by the MAC client 202 may comprise a plurality of conversations each comprising a plurality of different-sized frames. Within each conversation, the order of the frames may need to be maintained between the upstream node and the downstream node. However, transmitting a short frame may take less time than transmitting a long frame. Specifically, if two frames are transmitted over different links, a short frame may arrive at the downstream node before a long frame, and thus the frames may be received in a different order than they were sent. To preserve the correct ordering in a conversation, each of the frames in the conversation may be communicated over the same link.

At the upstream node, the link aggregation sublayer 200 may distribute the frame streams across the aggregated link using an aggregator 204, an aggregation controller 206, and a plurality of control parser/multiplexers 208. This process may begin when a frame distribution component 218 in the aggregator 204 receives the frame streams from the MAC client 202. The frame distribution component 218 uses a frame distributor 220 to distribute the frames in the frame stream to the aggregator parser/multiplexers 228 using a distribution algorithm. While various distribution algorithms may be used, in an embodiment the distribution algorithm does not duplicate the frames and sends all of the frames within a single conversation to the same port. Each aggregator parser/multiplexers 228 is associated with a port, and the distribution of the frames over the various ports allows the ports to load-share the transmission of the frames.

The frame distributor 220 may also include a marker generator/receiver 222 that generates a marker message to indicate the end of the conversation. The marker message allows the frame distribution component 218 in the downstream node to know when the conversation ends. The aggregator parser/multiplexers 228 may multiplex the marker message with the frames from the frame distributor 220 and pass the multiplexed data to the corresponding control parser/multiplexers 208. The control parser/multiplexers 208 may multiplex the frames with aggregation control data from a link aggregation control protocol 230 in an aggregation controller 206. The control parser/multiplexers 208 may then transmit the frames using one or more of an optional MAC control sublayers 212, a MAC sublayers 210, and a physical layers 214. The physical layers 214 communicate the frames to the downstream node using a link.

At the downstream node, the frames are received on the links and may be passed to the physical layers 214, the MAC layers 210, the MAC control layers 212, and then to the corresponding control parser/multiplexer 208. The control parser/multiplexers 208 parse the frames and send any aggregation control data to the link aggregation control protocol 230. The remainders of the frames are sent to the corresponding aggregator parser/multiplexers 228, where the frames may be parsed to extract any marker messages. The marker messages are sent to the marker responder 226, and the remainders of the frames are sent to the frame collector 224. The frame collector 224 reassembles the frames into the original frame stream, and forwards the frame stream to the MAC client 202. If the frames contain marker messages, the marker responder 226 may send a reply to the upstream node's marker generator/receiver 222 to indicate that all of the frames in the conversation were received.

Figure 3:
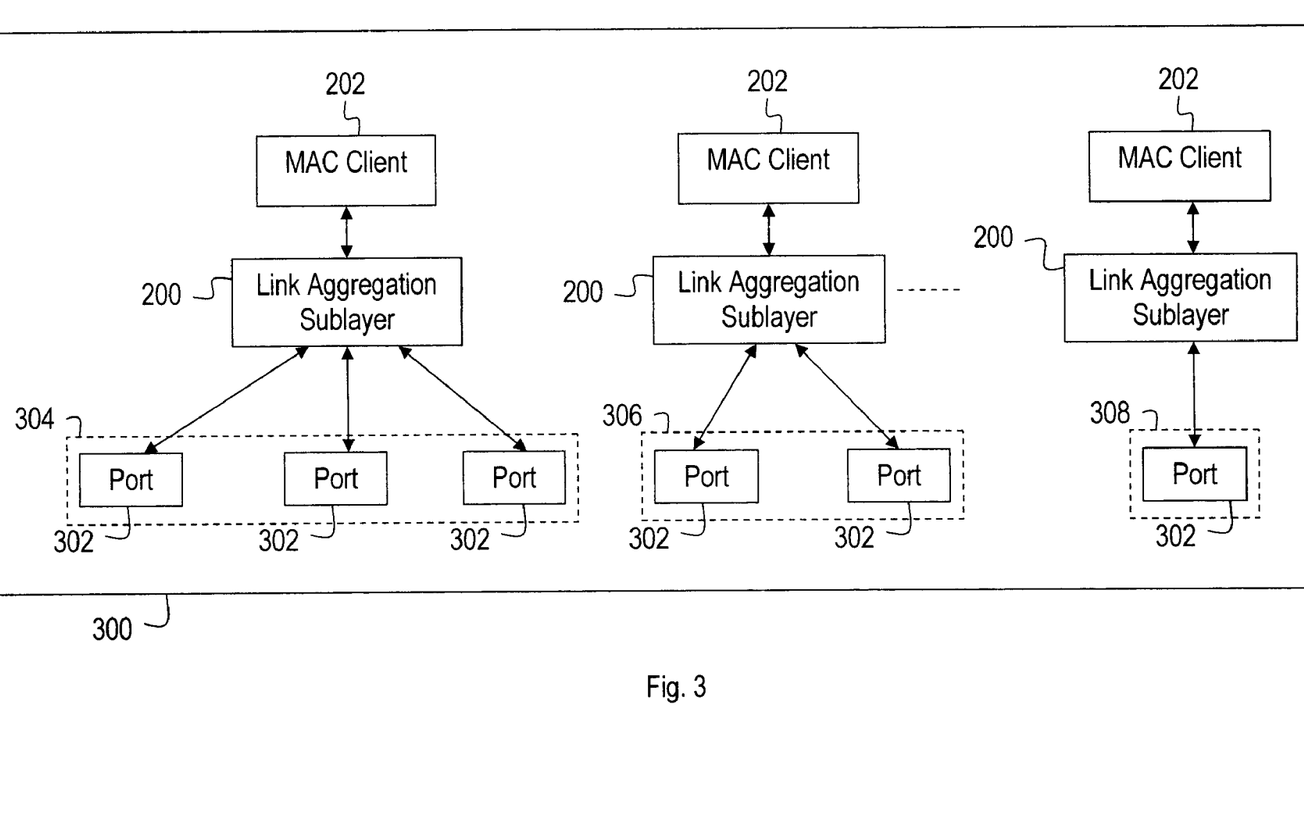
FIG. 3 is an illustration of an embodiment of a node.

FIG. 3 illustrates the relationship between the link aggregation sublayer 200 and the various ports. Specifically, FIG. 3 illustrates a node 300 comprising a plurality of ports 302 that correspond to the MAC control sublayer, the MAC sublayer, and the physical layer shown in FIG. 2. The ports 302 are aggregated together to form a plurality of aggregated links 304, 306, and 308. As shown, aggregated link 308 is associated with a single port 302, e.g. for transmission of a single conversation, while aggregated link 306 is associated with two ports 302 and the aggregated link 304 is associated with three ports. Although one configuration is shown in FIG. 3, the aggregated links 304, 306, and 308 may include any number of ports 302. Further, while the node 300 includes the plurality of aggregated links 304, 306, and 308, it is contemplated that the node 300 may only have a single aggregated link. Likewise, while each of the aggregated links 304, 306, and 308 have a different number of ports 302, the aggregated links 304, 306, and 308 may each have an equal number of ports 302.

The distribution of frames among the ports 302 may depend on the priority of the data in the frames. Specifically, some frames may carry high priority data, such as video, audio, voice, or other high priority data, while other frames may carry low priority data, such as browser packets or other best effort packet data. The high priority data may be identified using a type protocol identifier (TPID), a virtual local area network identifier (VID), or any other data type identifier. The aggregated links described herein may be used for redundant transmission of the high priority data, thereby ensuring that the high priority data arrives at the downstream node. Specifically, the high priority data may be multicast over a plurality of links such that the same data is transmitted over multiple links. Multicasting the high priority data over at least two links mitigates the possibility of data loss, such that data loss may only occur if all of the links fail. In contrast, the low priority data may be load shared across multiple links such that the same data is not transmitted over more than one link. Load sharing the low priority data allows the throughput rate of the data to be maintained at an adequate level.

Figure 4:
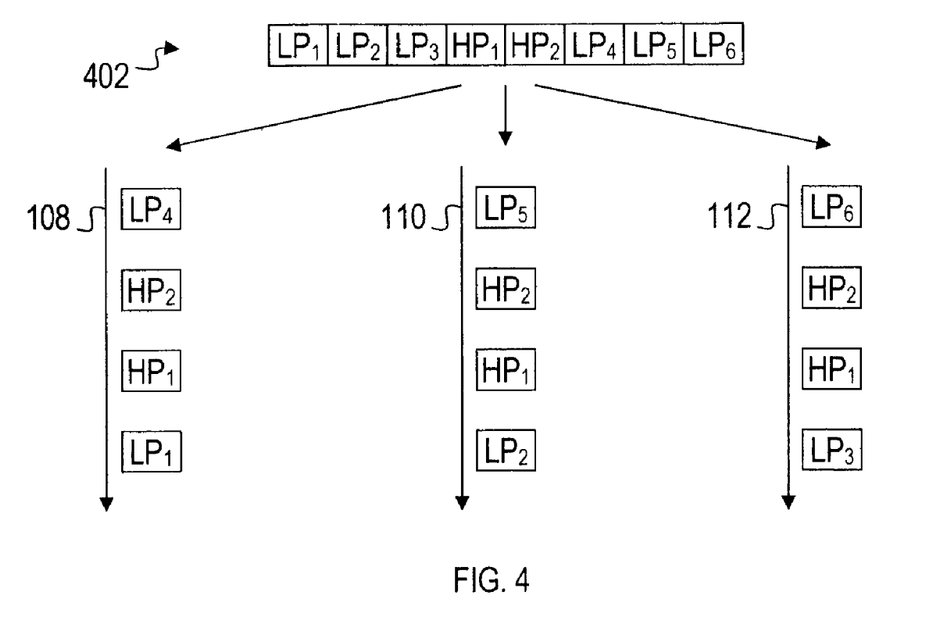
FIG. 4 is an illustration of an embodiment of a data transport process across an aggregated link.

FIG. 4 illustrates an exemplary data flow over the aggregated link. The upstream node may contain a frame stream 402 comprising low priority (LP) data and high priority (HP) data. The frame stream 402 may be transported to the downstream node using links 108, 110, 112, which may be part of an aggregated link between the upstream node and the downstream node. The frame stream 402 may be transmitted in the order shown in FIG. 4 from left to right and using the high priority multicasting scheme described above. Specifically, the first three frames carry low priority data, and may be load shared across the three links 108, 110, 112 such that each link 108, 110, 112 transports one of the frames carrying low priority data. Subsequent to the first three frames, the frame stream 402 contains two frames carrying high priority data that are multicast over all of links 108, 110, 112. Specifically, the frames $HP_1$ and $HP_2$ are each transported over each of the links 108, 110, and 112. By doing so, the high priority data is communicated redundantly over the links, thereby improving the resilience of the high priority data. Finally, the three remaining frames carrying low priority data are distributed across the three links 108, 110, 112.

Figure 5:
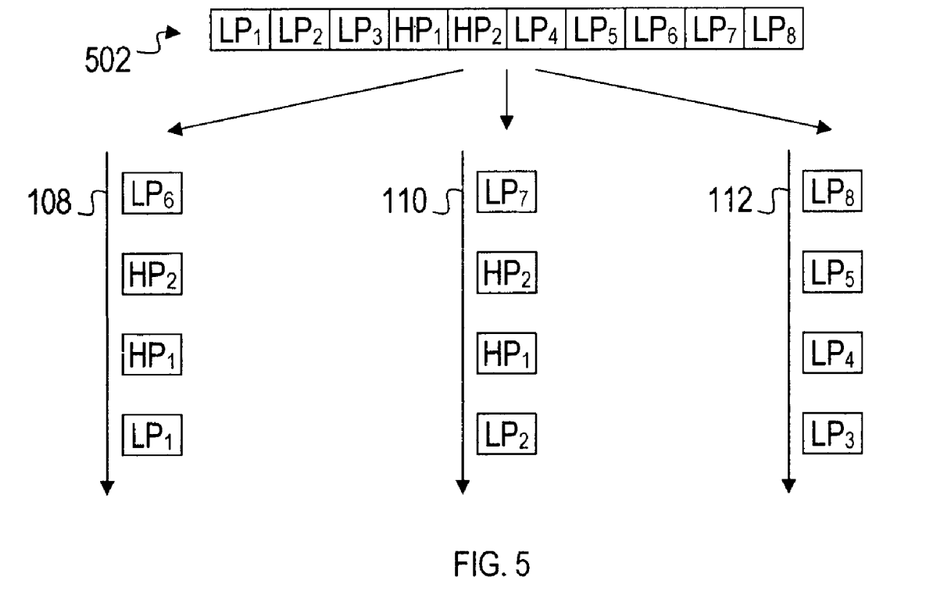
FIG. 5 is an illustration of another embodiment of the data transport process across the aggregated link.

FIG. 5 illustrates another exemplary data flow over the aggregated link where the high priority data is multicast over less than all of the links. Similar to above, the upstream node may contain a frame stream 502 comprising low priority data and high priority data. The frame stream 502 may be transported to the downstream node using links 108, 110, 112, which may be part of an aggregated link between the upstream node and the downstream node. The frame stream 502 may be transmitted in the order shown in FIG. 5 from left to right and using a variation of the high priority multicasting scheme described above. Specifically, the first three frames carry low priority data, and may be load shared across the three links 108, 110, 112 such that each link 108, 110, 112 transports one of the frames carrying low priority data. Subsequent to the first three frames, the frame stream 502 contains two frames carrying high priority data. In contrast with the embodiment shown in FIG. 4, the frames carrying high priority data are multicast over links 108, 110, but not link 112. Specifically, the frames $HP_1$ and $HP_2$ are each transported over each of the links 108 and 110. Such an embodiment leaves link 112 free to transport frames carrying low priority data, and thus maintains an adequate throughput rate of frames carrying low priority data when there is an abundance of frames carrying high priority data. Finally, the five remaining frames carrying low priority data may be distributed across the three links 108, 110, 112.

Figure 6:
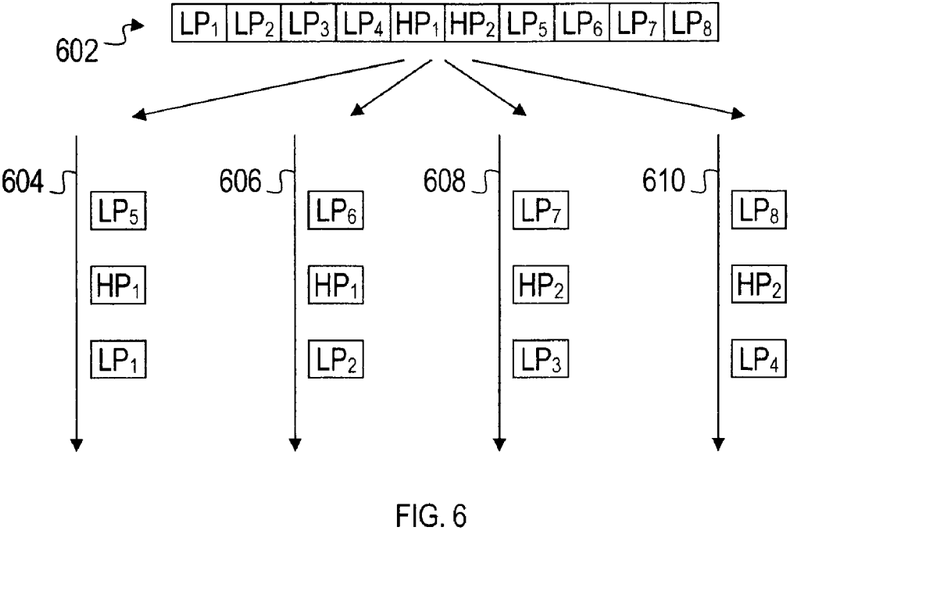
FIG. 6 is an illustration of another embodiment of the data transport process across the aggregated link.

FIG. 6 illustrates another exemplary data flow over the aggregated link where the high priority data is multicast over different groups of links. Similar to above, the upstream node may contain a frame stream 602 comprising low priority data and high priority data. The frame stream 602 may be transported to the downstream node using links 604, 606, 608, 610, which may be part of an aggregated link between the upstream node and the downstream node. The frame stream 602 may be transmitted over the links 604, 606, 608, 610 in the order shown in FIG. 6 from left to right and using another variation of the high priority multicasting scheme described above. Specifically, the first four frames carry low priority data, and may be load shared across the four links 604, 606, 608, 610 such that each link 604, 606, 608, 610 transports one of the frames carrying low priority data. Subsequent to the first four frames, the frame stream 602 contains four frames carrying high priority data.

In contrast with the embodiments shown in FIGS. 4 and 5, some of the frames carrying high priority data are multicast over links 604 and 606, while the remaining frames carrying high priority data are multicast over links 608 and 610. The frames carrying low priority data are distributed over the various links 604, 606, 608, 610, as described above. However, the frame $HP_1$ is multicast over links 604 and 606, while the frame $HP_2$ is multicast over links 608 and 610. Such an embodiment provides redundancy for the high priority data while maintaining adequate throughput rates for the high priority and low priority data. While the groups of links that multicast the high priority data are shown as having the same number of links, it is contemplated that each group of links may have a different number of links. For example, a first group may have three links and a second group may have two links. Finally, the four remaining frames carrying low priority data are distributed across the four links 604, 606, 608, 610.

Figure 7:
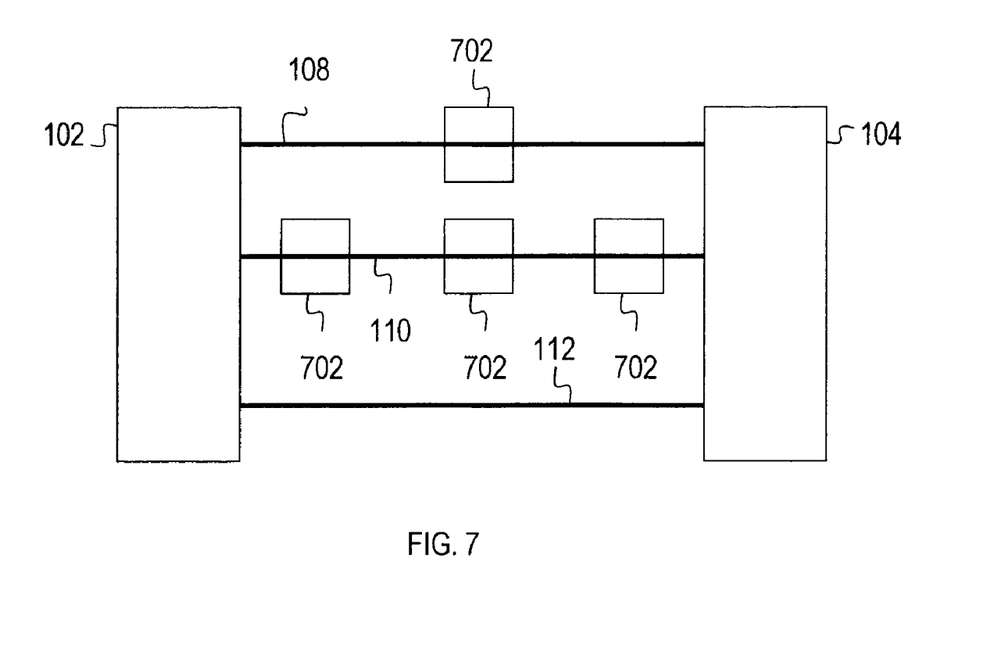
FIG. 7 is an illustration of another embodiment of the data transport system.

FIG. 7 illustrates an embodiment where the links 108, 110, 112 contain intervening nodes 702. Specifically, link 108 has one intervening node 702, link 110 has three intervening nodes 702, and link 112 does not have any intervening nodes 702. Each intervening node 702 may delay the transmission of data such that the data transmission time between nodes 102 and 104 is different for each of the links 108, 110, and 112. Different transmission times in each of the links 108, 110, and 112 may cause high priority data that has been multicast over two or more links 108, 110, and 112 to arrive at different times. The staggered reception of the high priority data may require buffering or other processing to ensure that no high priority data is lost or duplicated.

Figure 8:
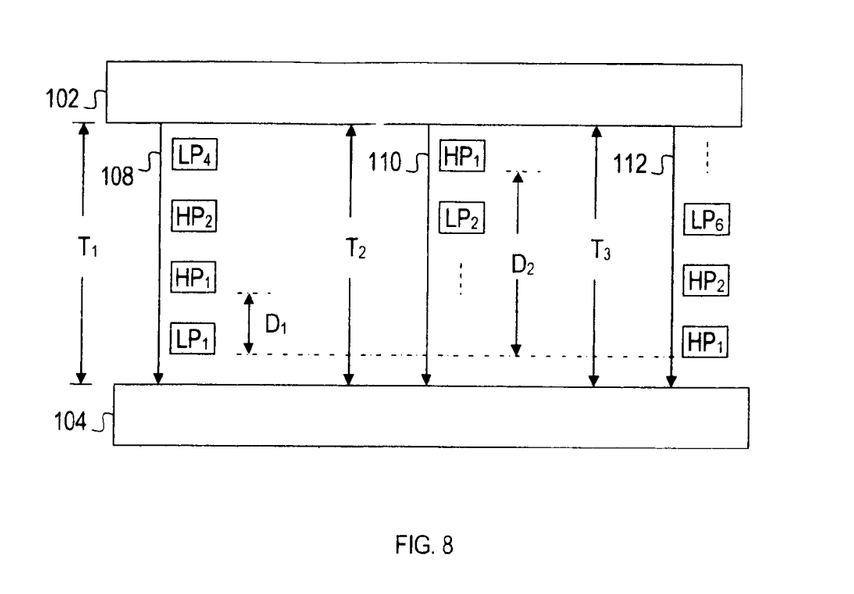
FIG. 8 is an illustration of another embodiment of the data transport process across the aggregated link.

FIG. 8 illustrates one possible result when links 108, 110, and 112 have different transmission times and are used to transmit the frame stream shown in FIG. 4. Specifically, links 108, 110, 112 transport the frames from the upstream node 102 to the downstream node 104. Link 108 has a transmission time of $T_1$, link 110 has a transmission time $T_2$, and link 112 has a transmission time $T_3$, where $T_2$ may be greater than $T_1$ and $T_1$ may be greater than $T_3$. Due to the differences in $T_1$, $T_2$, and $T_3$, when the downstream node 104 receives frame $HP_1$ on link 112, the frame $HP_1$ is still in transit on links 108 and 110. As such, the different transmission times cause a delay, $D_1$, between the times when high priority packets are received on link 112 and when high priority packets are received on link 108. Similarly, the different transmission times cause another delay, $D_2$, between the times when high priority packets are received on link 112 and when high priority packets are received on link 110. As shown in FIG. 8, $D_2$ may be greater than $D_1$.

In an embodiment, the downstream node 104 may have some knowledge of the relative transmission times $T_1$, $T_2$, and $T_3$. For example, the downstream node 104 may know that link 112 has the shortest transmission time, link 108 has an intermediate transmission time, and link 110 has the longest transmission time. Alternatively, the downstream node 104 may be aware of the actual transmission times associated with the links 108, 110, 112. Using such knowledge, the downstream node 104 may select the link with the shortest transmission time, e.g. link 112, to receive the high priority data, and ignore the high priority data received on the remaining links, e.g. links 108 and 110. If link 112 fails or the high priority data is not received correctly, then the downstream node 104 may select another link, e.g. link 108 or 110, to receive the high priority data. For example, if the link 112 fails while transmitting frame $HP_1$, then frame $HP_1$, will still be in transit on link 108 and delayed by delay $D_1$. Similarly, if link 108 subsequently fails, then link 110 may be selected for receiving frame $HP_1$. In such a case, no high priority data is lost as long as the link selection time is less than the delay $D_1$ or $D_2$.

While the above embodiment may prevent high priority data from being lost, it may not prevent frame duplication. For example, if link 112 fails after having received frame $HP_1$, then it is possible for one of links 108 or 110 to be selected prior to the downstream node 104 receiving frame $HP_1$ on the links 108 or 110. In such a case, some of the frames carrying high priority data may be received more than once, and the downstream node 104 may discard the subsequent reception of the frames carrying high priority data. While buffering or additional processing may be used to prevent duplication of high priority data, synchronizing the two nodes may also alleviate the problem of duplicated data. Specifically, the downstream node 104 may be synchronized to the upstream node 102 such that data sent on different links 108, 110, 112 with different transmission times may be received at the same time. By synchronizing the two nodes 102, 104, the high priority data may be received at the same time on all of the links 108, 110, 112, and buffering or other processing may be unnecessary. In such a case, when one of the links fails, another link carrying the high priority data may be selected for reception of the high priority data without causing a delay in the high priority data flow.

Node synchronization may be established using a variety of synchronization methods. For example, if the nodes 102, 104 are Ethernet nodes, then synchronization may be established as described in IEEE 1588, incorporated herein by reference as if reproduced in its entirety. In another embodiment, synchronization may be established using timestamp information located in an inter-packet gap, as is the case in the H-Sync operational mode described in the aforementioned patent application entitled "Inter-Packet Gap Network Clock Synchronization." Node synchronization may also be accomplished by calculating the transmission delays between nodes 102, 104, as is the case in the H-TDM operational mode described in the same aforementioned patent application.

The aggregation methods described herein may be particularly advantageous when transporting time divisional multiplexed (TDM) data streams. Generally, TDM data streams may contain different data at different times, and are typically used in environments where different devices are assigned timeslots and transport the data over a shared communication medium. For example, some timeslots may be assigned for downstream communication between two devices, and other timeslots may be assigned for upstream communication between the two devices. Within the context of the present disclosure, a TDM data stream may be a single data stream communicated between the nodes 102, 104, where different timeslots in the TDM data stream are assigned to carry high priority data or low priority data.

Figure 9:
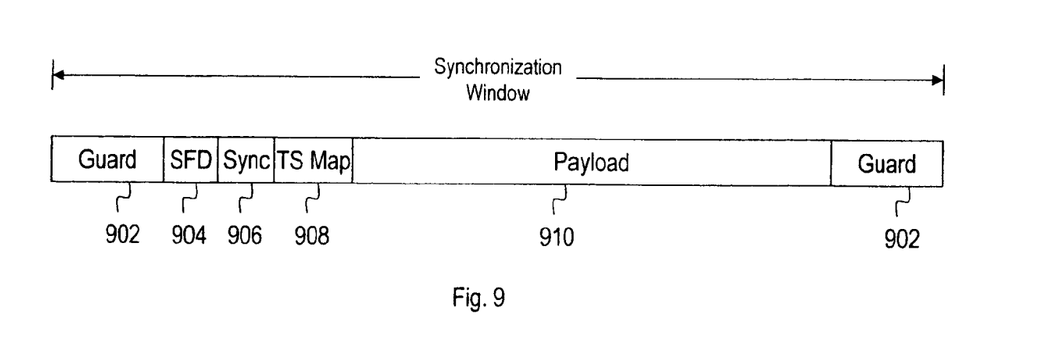
FIG. 9 is an illustration of one embodiment of an overlay synchronous timeslot scheme.

FIG. 9 illustrates an exemplarily format of a TDM data stream used by the Huawei time divisional multiplexed (H-TDM) operational mode. A detailed disclosure of the H-TDM operational mode is provided in the aforementioned provisional and non-provisional patent applications. Briefly, the H-TDM operational mode contains an overlay synchronous timeslot scheme that may provide TDM data transport within a synchronization window having a predetermined period. In an embodiment, the H-TDM overlay synchronous timeslot scheme is communicated within a synchronization window having a period of about 125 microseconds (μs). The H-TDM overlay synchronous timeslot scheme may include guard intervals 902 that create a floating window containing an overlay synchronous timeslot frame, referred to herein as an H-TDM frame. A start of frame delimiter (SFD) 904 may delineate a beginning of the H-TDM frame. A synchronization timestamp (Sync) 906 may be used to initiate the synchronization window and/or synchronize the synchronization windows between two or more nodes. The H-TDM frame also includes a timeslot map (TS Map) 908 and a payload 910. The payload 910 is a series of timeslots that carry the data that is being transported by the H-TDM frame. Each timeslot of the payload 910 may be assigned to carry the data of one of a plurality of different data types. The TS map 908 may indicate the assignment of each of the timeslots in the payload 910.

Each timeslot of the payload 910 may be assigned to carry one of TDM data, high performance flow (HPF) data, or best effort packet (BEP) data. The TDM data may include data for PSTN channels, or any other TDM data. The HPF data may include any data with stringent quality of service (QoS) requirements and may require a deterministic amount of bandwidth. For example, the HPF data may be a high priority Ethernet packet, a real-time data stream such as a streaming multimedia presentation, audio data, video data, other multimedia data, or any other high priority data. The BEP data may include low priority Ethernet packet data, data downloads, web browsing, or any other low priority data. The timeslots assigned to carry the TDM and HPF timeslots may be considered high priority timeslots, while the timeslots assigned to carry BEP data may be considered low priority timeslots.

While synchronizing the nodes may cause the high priority data to be received at the same time, such is not always the case. Looking back to FIG. 4, frames $LP_1$, $LP_2$, and $LP_3$ are transmitted prior to frame $HP_1$. While these frames contain low priority data, they may each contain different low priority data. This difference may cause the frames carrying high priority data to be received at different times even though the nodes 102 and 104 are synchronized. The H-TDM frame solves such a problem by making the timeslots in the H-TDM frame the same size. Specifically, the H-TDM frame may carry a predetermined quantity of timeslots, and each timeslot may carry an octet of data such that only a portion of a frame is carried in each timeslot. In such an embodiment, the nodes receive the frames on the links at substantially the same time when the nodes are synchronized and transmit equally sized frames.

Figure 10:
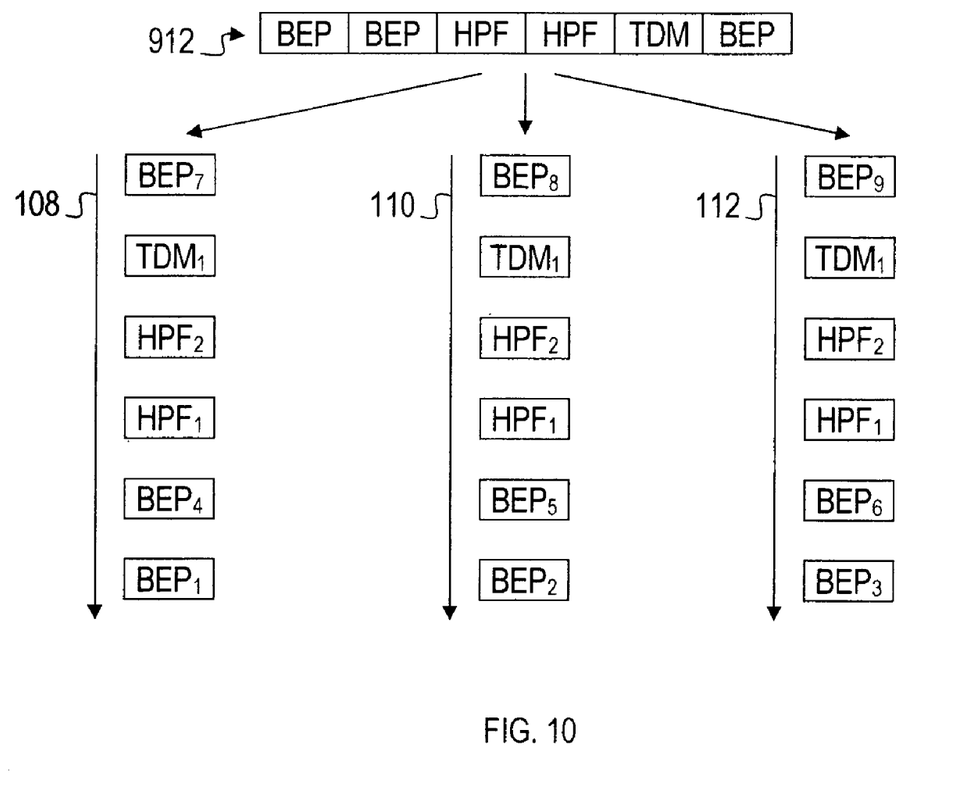
FIG. 10 is an illustration of another embodiment of the data transport process across the aggregated link.

FIG. 10 illustrates an example of the transmission of a portion of an H-TDM data stream 912 across the aggregated link using the high priority multicasting scheme described above. Similar to the previous examples, the data stream 912 is transmitted from left to right and includes two timeslots assigned to carry BEP data, two timeslots assigned to carry HPF data, one timeslot assigned to carry TDM data, and another timeslot assigned to carry BEP data. The links 108, 110, and 112 transport the data stream 912 between the nodes. Specifically, link 108 carries a first portion of BEP data, $BEP_1$, link 110 carries another portion of BEP data, $BEP_2$, and link 112 carries another portion of BEP data, $BEP_3$. Thus, load sharing is used to transmit the low priority BEP data on each of the links 108, 110, and 112.

In one embodiment, the portions of BEP data may be from a single BEP frame, such as an Ethernet frame. In this case, the downstream node may collect the data received on each of the links 108, 110, and 112 in a predetermined order. For example, if $BEP_1$, $BEP_2$, and $BEP_3$ contain sequential portions of an Ethernet frame, then the downstream node may collect the BEP data from the links 108, 110, and 112 in that order. Specifically, the downstream node may collect $BEP_1$ from link 108, then collect $BEP_2$ from link 110, and then collect $BEP_3$ from link 112 so that the received data retains the same structure as the data sent on the links 108, 110, and 112. In another embodiment, the portions of BEP data transmitted on the links 108, 110, and 112 may be from different BEP frames. For example, link 108 may communicate part of a first BEP frame, link 110 may communicate part of a second BEP frame, and link 112 may communicate part of a third BEP frame. In this example, $BEP_1$ may be the beginning of the first frame, $BEP_2$ may be the beginning of the second frame, and $BEP_3$ may be the beginning of the third frame. In such a case, the downstream node may process the three data streams concurrently.

Returning to FIG. 10, the data stream 912 continues with two timeslots assigned to carry HPF data and a timeslot assigned to carry TDM data. Similar to the embodiment illustrated in FIG. 4, the data in the high priority timeslots is multicast over links 108, 110, and 112. Specifically, the portion of HPF data, $HPF_1$, carried in the first HPF timeslot is multicast over each of the links 108, 110, and 112. As such, the high priority data is communicated redundantly over the links 108, 110, and 112, which improves the resilience of the high priority data. The TDM data is similarly multicast across the links 108, 110, 112 with a similar improvement in resilience. Finally, the remaining BEP data is distributed across the links 108, 110, 112.

While the above example was described using the H-TDM frame format, other TDM data streams with equally sized timeslots may be similarly transported over links 108, 110, and 112. Further, while the example of FIG. 10 follows the embodiment illustrated in FIG. 4 by multicasting the high priority data over all of the links, the H-TDM frame may similarly be communicated in accordance with the other embodiments illustrated in FIG. 5 and FIG. 6. That is, the high priority data of the H-TDM frame may be multicast over less than all of the links, or the high priority data of the H-TDM frame may be multicast in one of a plurality of groups of links.

Figure 11:
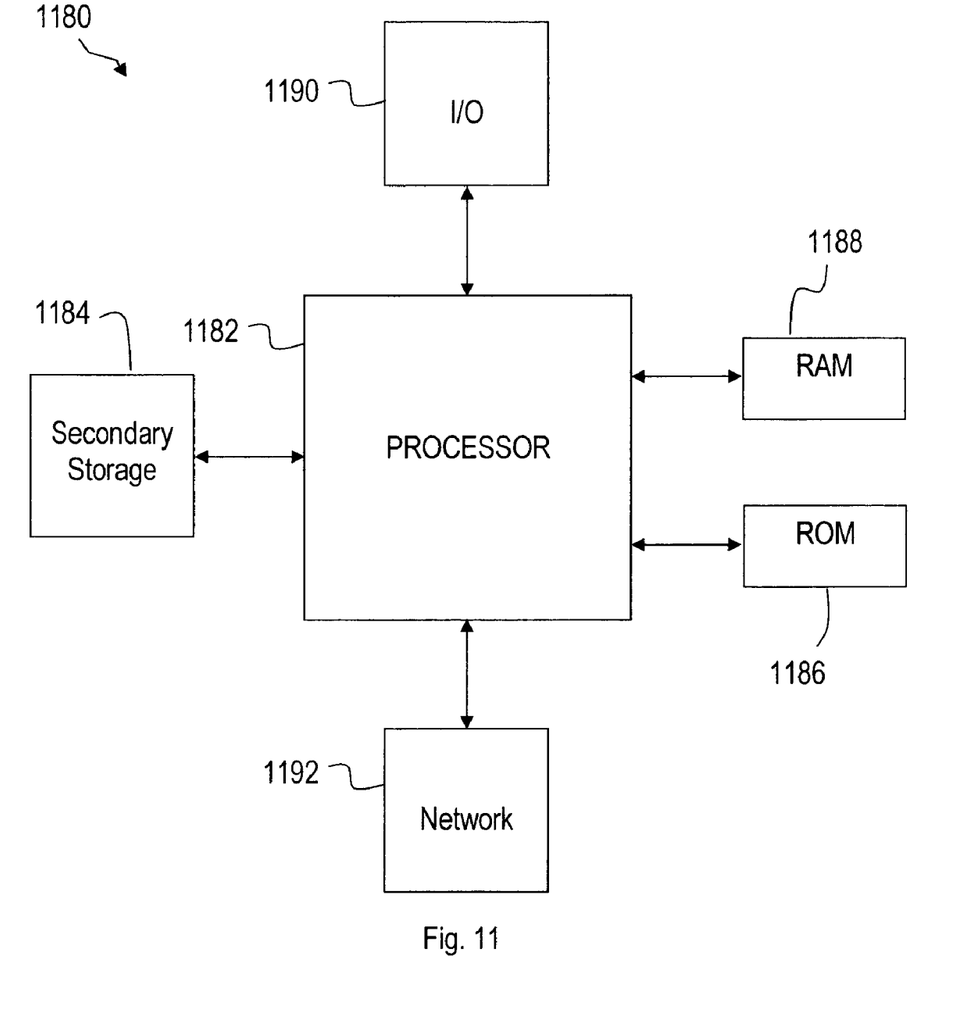
FIG. 11 is an illustration of one embodiment of a general-purpose computer system suitable for implementing the several embodiments of the disclosure.

The systems and methods described above may be implemented on any general-purpose computer with sufficient processing power, memory resources, and network throughput capability to handle the necessary workload placed upon it. FIG. 11 illustrates a typical, general-purpose computer system suitable for implementing one or more embodiments disclosed herein. The computer system 1180 includes a processor 1182 (which may be referred to as a central processor unit or CPU) that is in communication with memory devices including secondary storage 1184, read only memory (ROM) 1186, random access memory (RAM) 1188, input/output (I/O) 1190 devices, and network connectivity devices 1192. The processor 1182 may be implemented as one or more CPU chips.

The secondary storage 1184 is typically comprised of one or more disk drives or tape drives and is used for non-volatile storage of data and as an over-flow data storage device if RAM 1188 is not large enough to hold all working data. Secondary storage 1184 may be used to store programs which are loaded into RAM 1188 when such programs are selected for execution. The ROM 1186 is used to store instructions and perhaps data which are read during program execution. ROM 1186 is a non-volatile memory device which typically has a small memory capacity relative to the larger memory capacity of secondary storage 1184. The RAM 1188 is used to store volatile data and perhaps to store instructions. Access to both ROM 1186 and RAM 1188 is typically faster than to secondary storage 1184.

I/O 1190 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1192 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1192 may enable the processor 1182 to communicate with an Internet or one or more intranets. With such a network connection, it is contemplated that the processor 1182 might receive information from the network, or might output information to the network in the course of performing the above-described method steps. Such information, which is often represented as a sequence of instructions to be executed using processor 1182, may be received from and outputted to the network, for example, in the form of a computer data signal embodied in a carrier wave.

Such information, which may include data or instructions to be executed using processor 1182 for example, may be received from and outputted to the network, for example, in the form of a computer data base-band signal or signal embodied in a carrier wave. The base-band signal or signal embodied in the carrier wave generated by the network connectivity devices 1192 may propagate in or on the surface of electrical conductors, in coaxial cables, in waveguides, in optical media, for example optical fiber, or in the air or free space. The information contained in the base-band signal or signal embedded in the carrier wave may be ordered according to different sequences, as may be desirable for either processing or generating the information or transmitting or receiving the information. The base-band signal or signal embedded in the carrier wave, or other types of signals currently used or hereafter developed, referred to herein as the transmission medium, may be generated according to several methods well known to one skilled in the art.

The processor 1182 executes instructions, codes, computer programs, scripts which it accesses from hard disk, floppy disk, optical disk (these various disk based systems may all be considered secondary storage 1184), ROM 1186, RAM 1188, or the network connectivity devices 1192.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. In addition, persons of ordinary skill in the art will appreciate that the term octet as used herein is synonymous with the term byte, and that the octets described herein do not necessarily have to contain eight bits.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by persons of ordinary skill in the art and could be made without departing from the spirit and scope disclosed herein.

What is claimed is:

1. A network component comprising:
   a processor coupled to memory and configured to implement a method comprising:
   communicating a data stream to a destination over a plurality of links, the data stream comprising a high priority data and a plurality of low priority data,
   wherein the high priority data comprises time division multiplexed data and is duplicated over at least two of the links,
   wherein the low priority data is distributed over at least some of the links, and
   wherein the low priority data is not duplicated.

2. The network component of claim 1, wherein the high priority data is communicated over substantially all of the links, and wherein a portion of the low priority data is communicated over less than all of the links.

3. The network component of claim 1, wherein the destination receives the high priority data when one of the links fails.

4. The network component of claim 1,
   wherein the data stream comprises a plurality of timeslots organized into a timeslot pattern,
   wherein each timeslot carries the high priority data or one of the low priority data, and
   wherein the same timeslot pattern is communicated over each of the links, and
   wherein each timeslot is one octet in length.

5. The network component of claim 4, wherein the high priority data carried in the high priority timeslots communicated over each of the links is identical, and wherein the high priority data is not buffered by a receiver that is configured to receive the high priority data.

6. The network component of claim 4, wherein the low priority data carried in the low priority timeslots communicated over each of the links is different.

7. A system comprising:
a first node:
a second node; and
an aggregated link comprising a plurality of links and coupling the first node to the second node,
wherein the second node receives a plurality of data streams on the aggregated link, each data stream comprising a high priority data that comprises time division multiplexed (TDM) data and a low priority data,
wherein each of the data streams comprises a plurality of high priority timeslots and a plurality of low priority timeslots,
wherein each of the high priority timeslots and the low priority timeslots are one octet in length,
wherein each of the high priority timeslots carries the same high priority data,
wherein each of the low priority timeslots carries different low priority data, and
wherein the high priority data in each data stream is substantially identical.

8. The system of claim 7, wherein the second node selects a first link from the links on which to receive the high priority data and ignores the high priority data received on the remaining links, and wherein the second node does not buffer the high priority data.

9. The system of claim 8, wherein when the second node determines that the first link has failed, the second node selects a second link from the links on which to receive the high priority data.

10. A network comprising:
a first node;
a second node;
a first path coupling the first node to the second node; and
a second path coupling the first node to the second node,
wherein a first data stream comprising a high priority data and a first low priority data is communicated over the first path,
wherein a second data stream comprising the high priority data and a second low priority data is communicated over the second path,
wherein the second low priority data is not transmitted over the first path, and
wherein the second node does not buffer the high priority data.

11. The network of claim 10, wherein the first node and the second node are synchronized such that the first data stream and the second data stream arrive substantially simultaneous at the second node when the first data stream and the second data stream are transmitted substantially simultaneous from the first node.

12. The network of claim 11, further comprising an intermediate node on the first path.

13. The network of claim 11, wherein the first path and the second path have different transmission delays.

14. The network of claim 10, wherein the second node is configured to process the high priority data received on the first path and ignore the high priority data received on the second path.

15. The network of claim 14, wherein the second node is configured to detect a failure in the first path and, upon detecting the failure, process the high priority data received on the second path and ignore any high priority data received on the first path.

16. The network of claim 14, wherein none of the high priority data is lost when the first path fails.

17. The network of claim 10, wherein the first data stream and the second data stream each comprises a plurality of high priority octet-sized timeslots that carry the high priority data and a plurality of low priority octet-sized timeslots that carry the first low priority data or the second low priority data, and wherein the high priority data comprises time division multiplexed data.

18. A network comprising:
a first node comprising an egress frame distributor component that duplicates and distributes data across paths;
a second node comprising an ingress frame collector component;
a first path coupling the first node's egress frame distributor component to the second node's ingress frame collector component; and
a second path coupling the first node's egress frame distributor component to the second node's ingress frame collector component,
wherein a frame stream comprises a high priority data, a first low priority data, and a second low priority data, wherein the data is distributed between a first data stream and a second data stream,
wherein the first data stream comprises the high priority data and the first low priority data and is communicated over the first path,
wherein the second data stream comprises the high priority data and the second low priority data and is communicated over the second path,
wherein the first data stream and the second data stream each comprises a plurality of high priority octet-sized timeslots that carry the high priority data and a plurality of low priority octet-sized timeslots that carry the first low priority data or the second low priority data,
wherein the timeslot pattern in the first data stream is similar to the timeslot pattern in the second data stream,
wherein the high priority data carried in the high priority timeslots in the first data stream is substantially identical to the high priority data carried in the high priority timeslots in the second data stream,
wherein the low priority data carried in the low priority timeslots in the first data stream is not identical to the low priority data carried in the low priority timeslots in the second data stream, and
wherein the second node does not buffer the high priority data.

19. The network of claim 18, wherein the first path has a lower transit time than the second path, and wherein the hi priority data comprises time division multiplexed data.

20. The network of claim 19, wherein the second node discards the high priority data from the second path when the second node receives the high priority data from the first path.

* * * * *

UNITED STATES PATENT AND TRADEMARK OFFICE
CERTIFICATE OF CORRECTION

| | | |
|---|---|---|
| PATENT NO. | : 7,813,271 B2 | Page 1 of 1 |
| APPLICATION NO. | : 11/739316 | |
| DATED | : October 12, 2010 | |
| INVENTOR(S) | : Fourcand | |

It is certified that error appears in the above-identified patent and that said Letters Patent is hereby corrected as shown below:

Column 14, Claim 19 lines 8-60 should read "The network of claim 18, wherein the first path has a lower transit time than the second path, and wherein the high priority data comprises time division multiplexed data."

Signed and Sealed this
Eleventh Day of January, 2011

David J. Kappos
*Director of the United States Patent and Trademark Office*